(12) United States Patent
Dargahi et al.

(10) Patent No.: US 8,380,747 B2
(45) Date of Patent: Feb. 19, 2013

(54) SYSTEM AND METHOD FOR SEAMLESSLY INTEGRATING SEPARATE INFORMATION SYSTEMS WITHIN AN APPLICATION

(75) Inventors: Ross Dargahi, Mountain View, CA (US); Kevin M. Henrikson, San Mateo, CA (US); Roland J. Schemers, Emerald Hills, CA (US); Jong Yoon Lee, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 342 days.

(21) Appl. No.: 12/258,793

(22) Filed: Oct. 27, 2008

(65) Prior Publication Data

US 2009/0100367 A1 Apr. 16, 2009

Related U.S. Application Data

(62) Division of application No. 11/503,810, filed on Aug. 14, 2006.

(60) Provisional application No. 60/774,017, filed on Feb. 16, 2006, provisional application No. 60/730,255, filed on Oct. 26, 2005.

(51) Int. Cl.
G06F 17/30 (2006.01)

(52) U.S. Cl. ........................................ 707/796; 709/217

(58) Field of Classification Search .................. 707/796; 709/217
See application file for complete search history.

(56) References Cited

U.S. PATENT DOCUMENTS

| | | | |
|---|---|---|---|
| 5,946,647 A | 8/1999 | Miller et al. | |
| 6,356,937 B1 | 3/2002 | Montville et al. | |
| 6,369,840 B1 | 4/2002 | Barnett et al. | |
| 6,493,695 B1 | 12/2002 | Pickering et al. | |
| 6,912,573 B2 | 6/2005 | Ohkado et al. | |
| 6,976,017 B1 | 12/2005 | Getchius | |
| 7,003,550 B1 | 2/2006 | Cleasby et al. | |
| 7,003,735 B2 | 2/2006 | Edlund et al. | |
| 7,130,885 B2 | 10/2006 | Chandra et al. | |
| 7,185,290 B2 | 2/2007 | Cadiz et al. | |
| 7,263,667 B1 | 8/2007 | Hoellerer et al. | |
| 7,360,164 B2 | 4/2008 | Bjoernsen et al. | |
| 7,406,498 B2 | 7/2008 | Reshef et al. | |
| 7,707,249 B2 | 4/2010 | Spataro et al. | |
| 7,730,081 B2 | 6/2010 | Bromm et al. | |
| 7,805,676 B2 | 9/2010 | Schemers | |
| 7,827,503 B2 * | 11/2010 | Jang ............................... 715/769 | |
| 7,979,802 B1 | 7/2011 | Appelman | |
| 8,132,226 B1 * | 3/2012 | Bianco et al. ..................... 726/1 | |
| 2001/0049628 A1 | 12/2001 | Icho | |
| 2002/0129106 A1 | 9/2002 | Gutfreund | |
| 2003/0135565 A1 | 7/2003 | Estrada | |
| 2004/0098349 A1 * | 5/2004 | Tolson ........................... 705/64 |

(Continued)

OTHER PUBLICATIONS

James R. Miller and Thomas Bonura, From Documents to Objects, Apr. 1998, vol. 30, No. 2, pp. 53-58.*

(Continued)

*Primary Examiner* — Kim Nguyen

(57) ABSTRACT

The present invention is, in one embodiment, a system and method based on a client-server architecture for seamlessly integrating various information systems. In one embodiment, a bundle of files is deployed to a collaboration client, in order to enable the integration of the collaboration client with disparate information systems and content. In one embodiment, content within a mailbox item is allowed to become a "live" object, and is associated with trigger events, and actions, including sending all or part of the content to a separate information system. In one embodiment, mailbox items are subjected to predefined searches to assess whether they include certain content objects. In another embodiment, panel item elements are visible in the overview panel of the collaboration client. The user may interact with the panel items by dragging content onto them, double clicking them, and invoking actions from a context menu if one is available.

20 Claims, 15 Drawing Sheets

U.S. PATENT DOCUMENTS

| | | |
|---|---|---|
| 2005/0097440 A1 | 5/2005 | Lusk et al. |
| 2005/0262076 A1* | 11/2005 | Voskuil .............................. 707/8 |
| 2005/0289470 A1 | 12/2005 | Pabla |
| 2006/0004605 A1* | 1/2006 | Donoghue et al. ................ 705/2 |
| 2006/0010221 A1 | 1/2006 | Srinivasan |
| 2006/0010379 A1 | 1/2006 | Kashi |
| 2006/0069635 A1* | 3/2006 | Ram et al. ........................ 705/37 |
| 2006/0095966 A1 | 5/2006 | Park |
| 2007/0028184 A1* | 2/2007 | Jang .............................. 715/769 |
| 2007/0054678 A1 | 3/2007 | Doulton |
| 2007/0073770 A1* | 3/2007 | Morris et al. .............. 707/104.1 |
| 2007/0073841 A1* | 3/2007 | Ryan et al. .................... 709/217 |
| 2008/0155439 A1* | 6/2008 | Stern et al. ................... 715/769 |
| 2009/0049123 A1 | 2/2009 | Dargahi et al. |
| 2009/0100010 A1 | 4/2009 | Dargahi et al. |
| 2009/0100347 A1 | 4/2009 | Schemers |
| 2009/0100367 A1 | 4/2009 | Dargahi et al. |
| 2009/0150066 A1 | 6/2009 | Grason et al. |
| 2009/0150363 A1 | 6/2009 | Gross et al. |
| 2010/0011310 A1* | 1/2010 | Rainisto ........................ 715/769 |

OTHER PUBLICATIONS

"Complete tasks quickly with Smart Tags in Office XP" Help and How-to, Microsoft Office Online, <http://office.microsoft.com/en-us/help/HA010347451033.aspx?mode=print, May 2, 2007, pp. 1-7.

"Complete tasks quickly with Smart Tags in Office XP—Help and How-to—Microsoft Office Online", http://office.microsoft.com/en-us/help/HA010347451033.aspx?mode=print, 7.

"Quick Guide for Calendar", for Lotus Notes 6, 2002, 4 pages, www.wareSource.com.

Nagendra Nyamgondalu, "Lotus Notes Calendar and Scheduling Explained", Part 1, Oct. 18, 2004, 12 pages, http://www.ibm.com/developerworks/lotus/library/cs-pt1/.

* cited by examiner

Content Object 140

Tooltip 150 ee on Feb 26th or 02/28/06.

I'd recommend a couple books:

ver. The P.O. number is  and you can track the server with th

184

Panel
Items
210

SYSTEM AND METHOD FOR SEAMLESSLY INTEGRATING SEPARATE INFORMATION SYSTEMS WITHIN AN APPLICATION

CROSS-REFERENCES TO RELATED APPLICATIONS

This application is a divisional of co-pending application Ser. No. 11/503,810, entitled "System and Method for Seamlessly Integrating Separate Information Systems within an Application", which was filed on Aug. 14, 2006, and which in turn claims benefit of, and priority under 35 USC §119(e) to provisional application No. 60/774,017, which is entitled "System and Method for Integrating Separate Information Systems within a Collaboration Suite Application" which was filed on Feb. 16, 2006, and provisional application No. 60/730,255, which is entitled "System and Method for Integrating Separate Information Systems within a Collaboration Suite Application" and which was filed on Oct. 26, 2005. Each of these applications is hereby incorporated herein by reference in its entirety for all purposes.

This application is also related to co-pending application Ser. No. 12/258,826, entitled "System and Method for Seamlessly Integrating Separate Information Systems within an Application", which was filed on Oct. 27, 2008. This application is hereby incorporated herein by reference in its entirety for all purposes.

BACKGROUND OF THE INVENTION

1. Field of the Invention

This invention relates generally to integrating various separate information systems seamlessly for a user, and more particularly, to allowing a user to interact with separate information systems from within a collaboration suite application.

2. Description of the Related Art

Collaboration suite applications typically include functionality such as email messaging, calendaring, and contact storage and retrieval, where email messages, calendar appointments, contacts, etc. are commonly referred to as "mailbox items." The Zimbra Collaboration Suite from Zimbra, Inc. (San Mateo, Calif.), Microsoft Exchange and Microsoft Outlook from Microsoft Corp. (Redmond, Wash.), and Lotus Notes from IBM (Armonk, N.Y.) are examples of collaboration suite applications.

Most information within a mailbox item cannot be acted upon by separate information systems (e.g., external applications running on the same or other computers, web servers, etc.). For example, if a purchase order number is included in an email, and the user wants approve that purchase order, he typically has to cut (or copy) the purchase order number, open a separate information system, paste that purchase order number into it, and then take any necessary steps to approve that purchase order. These steps are time consuming, annoying and inconvenient for a user.

There have been a few attempts made at addressing such problems. Some email programs can identify Uniform Resource Locators (URLs) within email messages, and a user can click on the URL to open up the corresponding web page. However, such a solution is strictly dependent on the collaboration suite client application, and no customization of any type is provided for. For instance, it is not possible for a user to recognize some other content (e.g. P.O. numbers, phone numbers, etc.), and/or to perform some other type of action upon recognizing specific content (e.g., logging the URL into a prespecified log rather than opening the corresponding web page). Thus this type of solution is non-extensible, non-flexible, and non-customizable.

Some other prior approaches attempted to provide extensible linking and actionable content. However, most of these require the author of the mailbox item (e.g., email) to identify and link the content. This is problematic for several reasons. First, the author of the item is burdened with the task of annotating the content appropriately. Second, this type of solution requires intelligence at the originating end, and its corresponding intelligence at the receiving end. This can be particularly problematic when the item originates with customers, business partners, or even employees on their home computers, all of which often rely on collaboration software (or email software) that is other than the receiving user's internal standard. It is much more desirable to have actionable content work seamlessly for all in-bound items, regardless of their source and their authors' actions.

Other approaches exist to extensible linking and actionable content, such as Smart Tags from Microsoft Corp. (Redmond, Wash.). Smart Tags were developed for Office desktop applications (Excel, Word, Outlook, etc. as well as Internet Explorer/IE). Smart Tags do not implement a client-server architecture, and rely on only client-side installation and execution of the linking and action defining code. They are problematic for numerous reasons. For instance, Smart Tags are severely limited in their user interface (UI), in that they merely created dotted lines under content identified as Smart Tag content, and the user can then click appropriately to display a pop-up menu. Other intuitive user interactions, such as mousing over the content, dragging and dropping the content onto other places, and displaying a pop-up panel which displays content (including $3^{rd}$ party content) is not available with Smart Tags. Second, Smart Tags are tied to Microsoft Applications, and are thus not compatible with all web browsers (e.g., non-Microsoft web browsers such as Mozilla Firefox, Apple Safari, etc.) and all operating systems (e.g., non-Microsoft compatible operating systems such as Linux, MacOS, etc.). Further, Smart Tags are not designed to work across the range of client devices that support the Web such as mobile phones, PDAs, tablet PCs, set-top boxes, and so on. Moreover, since there is no centralized server, Smart Tags cannot provide for indexing across clients (e.g., for search/discovery across mailboxes) such as is required for Sarbanes-Oxley or Human Resources compliance, fiduciary isolation of business units (such as automatically recognizing equity-related communications), and so on. Further still, performing all indexing/matching on the client increases computation overhead on the client. Furthermore, tight integration with Web 2.0 technologies like Asynchronous JavaScript and XML (Ajax) based user interfaces running in the browser, without any a prior installation of controls/plug-ins, is not feasible with Smart Tags, since they are based upon desktop applications rather than upon open internet technologies. In addition, client-side DLLs are also a security risk, particularly when they are permitted to access to client data or arbitrary services on the Internet.

Thus there is a need for a method and system based on a client-server architecture for seamlessly integrating various information systems with an application such as a collaboration suite application, in a generic and customizable manner. In addition, there is a need for a method and system which provides such integration via an intuitive and easy-to-use user interface. Furthermore, there is need for a method and system which provides such integration in a secure environment.

BRIEF SUMMARY OF THE INVENTION

The present invention is a system and method based on a client-server architecture for seamlessly integrating various information systems with an application such as a collaboration suite application in a generic and customizable manner. Some embodiments of the present invention provide such integration via an intuitive and easy-to-use user interface. Some embodiments of the present invention provide such integration in a secure environment.

In one embodiment, separate information systems are integrated with a collaboration suite client application ("collaboration client"). Examples of separate information systems include third party servers, as well as the collaboration server application that serves the collaboration client. In accordance with some embodiments of the present invention, Zimlets are used to integrate separate systems with a collaboration client. A Zimlet is a bundle of files that is deployed to the collaboration client. The files comprising the Zimlet bundle enable the integration of the collaboration client with disparate information systems and content.

In one embodiment, there are at least two ways in which separate information systems can be integrated with a collaboration client. (i) Content objects: Content that would otherwise have been static within a mailbox item is allowed to become a "live" object, and to be associated with trigger events, and actions, including sending the object to a separate information system and taking some action upon information corresponding to the object within the separate information system. Examples of content objects include phone numbers, purchase order numbers, contacts and calendar appointments. In addition, mailbox items can be subjected to predefined searches based on whether certain content objects are included in them. (ii) Panel item elements in the application overview panel of the collaboration client: The user may interact with the panel items by dragging content such as mail messages, contacts and calendar appointment onto them, double clicking them, and invoking actions from a context menu if one is available. For instance, for integrating with a mapping program, a user may drag one of his contacts onto a panel item, and the collaboration client will send the address from that contact to an external mapping program, such as Google maps or Mapquest, with a request for a map corresponding to such address.

In accordance with an embodiment of the present invention, Zimlets provide an extensible mechanism for integrating separate information systems into a collaboration suite application in that a system administrator can define the type of window generated (size, graphics, etc.), the type of content that the window accepts, and the action associated with that window. Therefore, a system administrator can tailor such Zimlets to interface with whatever information systems best suit user needs.

A system in accordance with an embodiment of the present invention consists of a client and server framework, as well as a set of web services and JavaScript APIs. They will be exposed to the end user via a client. In one embodiment, the client is implemented using Asychronous JavaScript and XML (AJAX). The server component is responsible for Zimlet life cycle management, server side indexing, and security. The client component is responsible for providing the framework to support presentation, user interaction, and customizing/authoring of Zimlets by the system administrator. This architecture enables the implementation of a broad range of these Zimlets, from those requiring little or no custom code (i.e. entirely declarative) to those that use JavaScript to tightly integrate rich UI behavior within the client. Such an architecture also makes it possible to have the server index content, such as email messages and attachments that contain content objects, so that the end user may search for such content by using either the "has" clause of the query language or by checking the appropriate checkbox in the relevant panel of the search builder. So if a Zimlet defining phone numbers has registered with the server for indexing, then a user may, for example, search for content containing phone numbers by issues the following search query: has:phone.

In accordance with one embodiment of the present invention, the collaboration client serves as a user interface to not only the collaboration suite server but also to various other remote servers. When content objects and/or panel items are recognized and/or interacted with, the communication from the user's computer goes to the Zimlet server, which in turn communicates with the various remote servers as appropriate. Routing the communications to the remote servers via the Zimlet server has several advantages, such as enhancing security.

In one embodiment of the present invention, the bundle of files comprising the Zimlet includes a Zimlet definition file. In one embodiment, this file is implemented in XML. In one embodiment, it is possible to define content objects and their corresponding context menus and tool tips, as well as template panel items and their actions, solely with XML. In other cases, it may be necessary or desirable to provide for complementary files in order to carry out the desired functions. This implementation is then referenced in the template definition file and included as part of the template bundle. In one embodiment, the complementary files are in JavaScript.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

DETAILED DESCRIPTION OF THE INVENTION

Figure 1A:
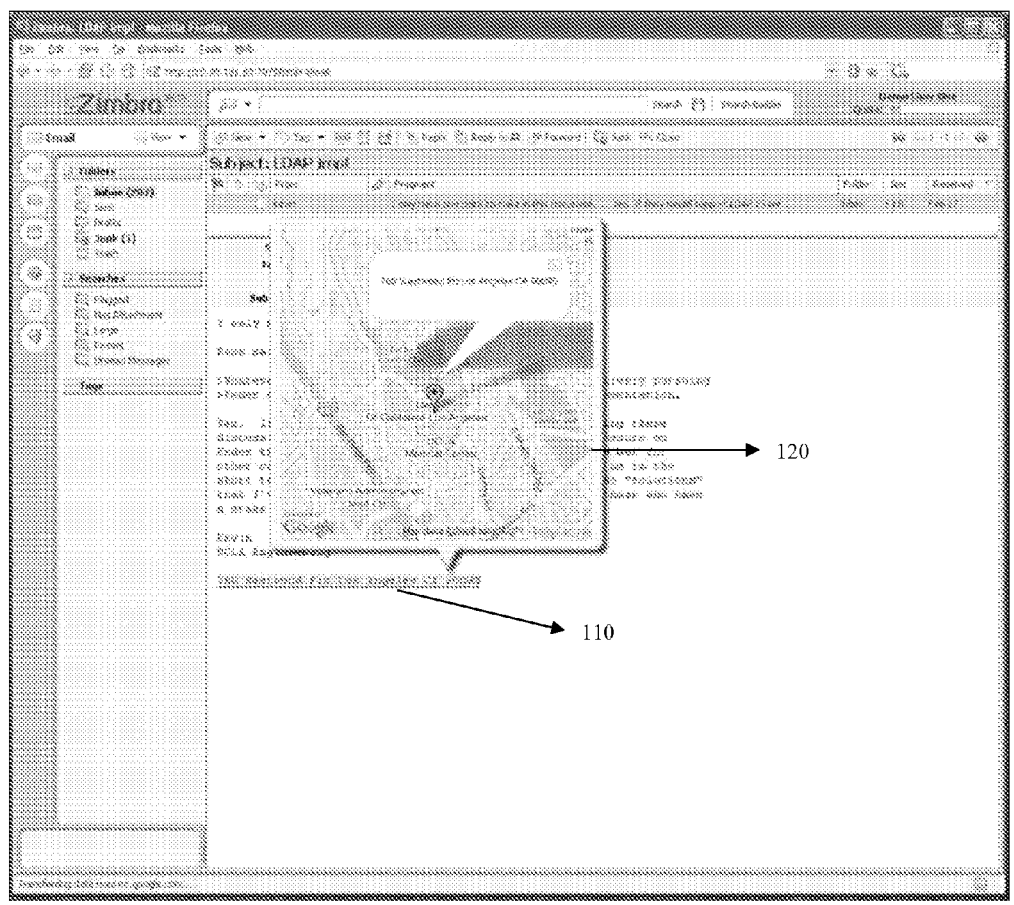
FIG. 1A is a screen shot which illustrates how a content object functions in accordance with an embodiment of the present invention.

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein. It is to be noted that while the following discussion focuses on embodiments of the present invention as applied to a collaboration suite, the invention can be applied to other applications, where a tighter integration between different information systems is desired. Further, each bundle of files that integrates the collaboration client with a separate information system is referred to as a "Zimlet." This is only a name used for reference, and it has no connection to functionality. Moreover, some examples are described with respect to the Zimbra Collaboration Suite from Zimbra Inc. (San Mateo, Calif.) who is the assignee of this patent application, but the invention is in no way limited to the Zimbra Collaboration Suite.

Various embodiments of the present invention provide a system and method for integrating separate information systems with a collaboration suite client application ("collaboration client"). Examples of separate information systems include third party servers, as well as the collaboration server application that serves the collaboration client. Further, in some embodiments of the present invention, user interfaces within the collaboration suite itself are "mashed-up" (intermixed). For instance, calendar information and contacts information may be mashed-up within the user's email. The term "mash-up" describes the aggregation and customization of multiple web interfaces and web services to eliminate context-switching between existing systems, a process which delivers a richer experience and a wider range of capabilities to the end user. Several technologies have enabled developers to create new and interesting ways of providing some very effective integrations. One example is Asychronous JavaScript and XML (AJAX), which facilitates creation of web applications with increased interactivity, speed, and usability of web pages. This is done by exchanging small amounts of data with the server behind the scenes, so that the entire web page does not have to be reloaded every time there is a change. Another example of such technologies is Representational State Transfer (REST), which is an architecture for distributed hypermedia systems like the world wide web. The term is generally used loosely for web-based interfaces that use XML and HTTP without extra abstractions such as the SOAP protocol.

The functionality, system architecture, and implementation of systems and methods in accordance with various embodiments of the present invention are described below.

Overview of Functionality

In accordance with some embodiments of the present invention, Zimlets are used to integrate separate systems with a collaboration client. A Zimlet is a bundle of files that is deployed to the collaboration client. The files comprising the Zimlet bundle enable the integration of the collaboration client with disparate information systems and content.

In accordance with some embodiments of the present invention, there are at least the following ways in which separate information systems can be integrated with a collaboration client. The functionality of these various ways is described below from a high-level. Further details regarding each of these are provided below under the system architecture and implementation sections.

1. Content Object Zimlets:

In accordance with one embodiment of the present invention, content that would otherwise have been static within a mailbox item is allowed to become a "live" object (referred to herein as "content object"), and to be associated with trigger events, and actions, including sending the object to a separate information system.

FIG. 1A is a screen shot which illustrates how a content object functions in accordance with an embodiment of the present invention. In this example, when a user of the collaboration suite application mouses over an address 110 in an email message, a Google map 120 of the address is displayed. In this example:

The content object is the address 110

The trigger event is the user mousing over the content object

The action is popping up a separate window within the collaboration suite, with the window displaying a separate information system, and with the text of the content object being passed as a parameter to the separate information system The separate information system is Google maps.

Figure 1B:
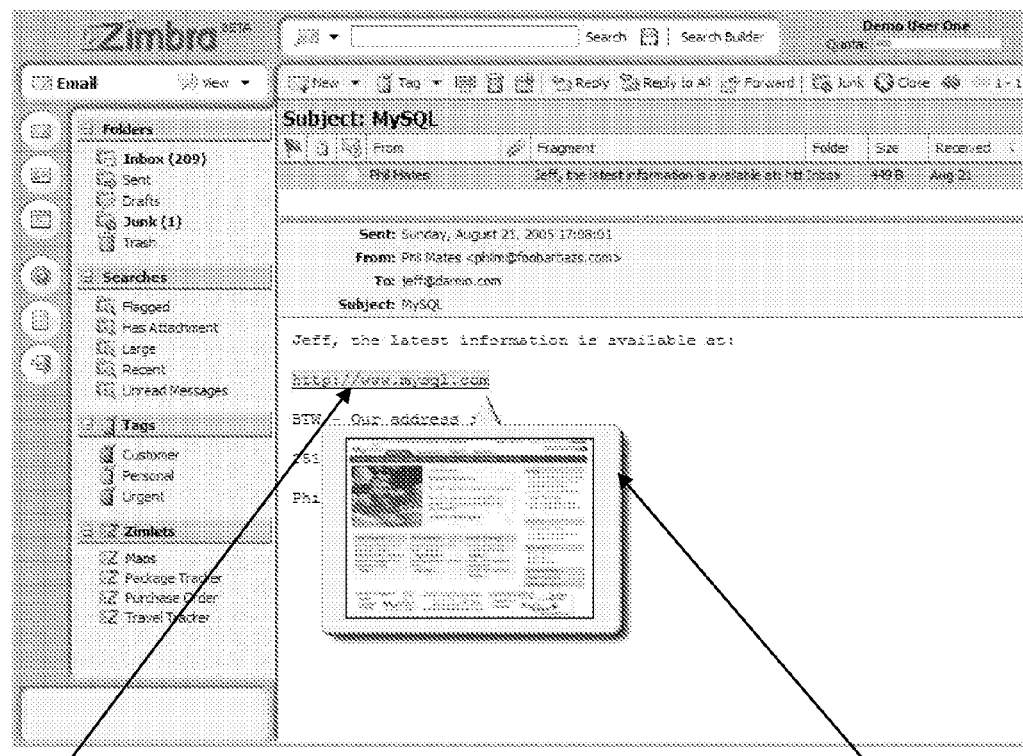
FIG. 1B is a screen shot which provides another example of how a content object functions in accordance with an embodiment of the present invention.

FIG. 1B is a screen shot which provides another example of how a content object functions in accordance with an embodiment of the present invention. In this example, when a user mouses over a Uniform Resource Locator (URL), a web page associated with the URL is displayed in a tooltip 150 that pops up within the collaboration suite. Here:

The content object is the URL 140

The trigger event is the user mousing over the content object

The action is popping up tooltip within the collaboration suite, with the tooltip displaying a separate information system, and with the text of the content object being passed as a parameter to the separate information system The separate information system here is alexa.com, from Amazon (Seattle, Wash.), which provides screen captures of websites. In this case, the Zimlet sends the URL to alexacom, and gets back an image preview.

Figure 1C:
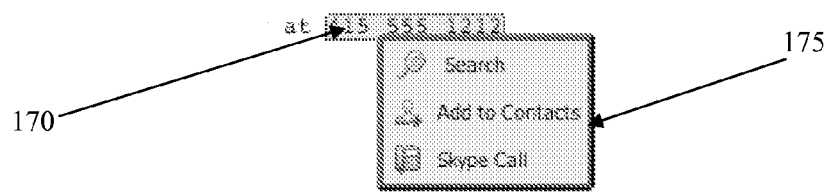
FIG. 1C illustrates another example of how a content object works in accordance with an embodiment of the present invention.

FIG. 1C illustrates another example of how content objects work. In this example, a phone number 170 was recognized as a content object. When the user right clicks on the content object, a menu 175 provides the user with several options such as searching for mailbox items that contain that phone number, adding the phone number to his contacts, and making a Voice over IP (VoIP) phone call. In this example, Skype from Skype (Luxemborg) is used for the VoIP call, but the same method could be applied to interface with other VoIP services. In response to the user selecting "make a call," from the pop-up menu, the content object (i.e., the phone number) is passed to an IP phone (Skype in this case). Here:

The content object is the phone number 170

The trigger event is the user right-clicking over the content object

The action is popping up a context menu within the collaboration suite, via which the user can interact with several separate information systems The separate information systems involved are Skype and the Collaboration Suite itself (e.g., the contacts).

Figure 1D:
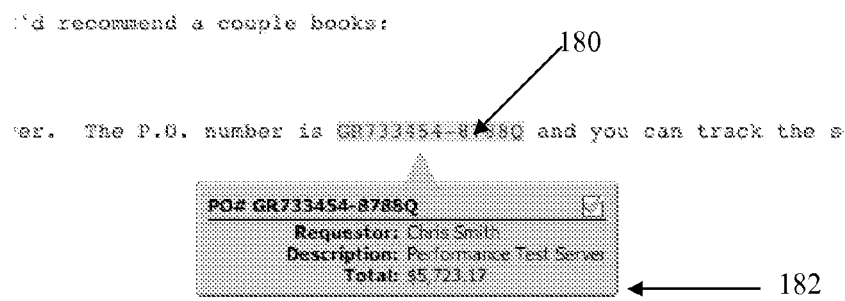
FIG. 1D shows a purchase order number which is recognized as a content object.
Figure 1E:
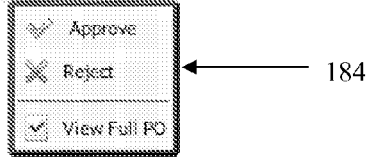
FIG. 1E shows a context menu which allows the user to take action on a purchase order.

FIG. 1D shows a purchase order (P.O.) number 180 which is recognized as a content object. When the user right hovers over the P.O. number 180, a brief description 182 of the associated P.O. shows up. For instance, here it can be seen that the requestor is "Chris Smith", the description is "Performance Test Server", and the amount is "$5,723.17". FIG. 1E shows that if the user right clicks on the P.O. number 180, a context menu 184 appears which allows the user to approve, or reject the P.O. associated with the P.O. number 180. In addition, the user can also view the full associated P.O. In one embodiment, if the user takes some action on the associated P.O. (e.g., approves it), the P.O. number content object 180 visually indicates this to the user (e.g., by changing color).

Figure 1F:
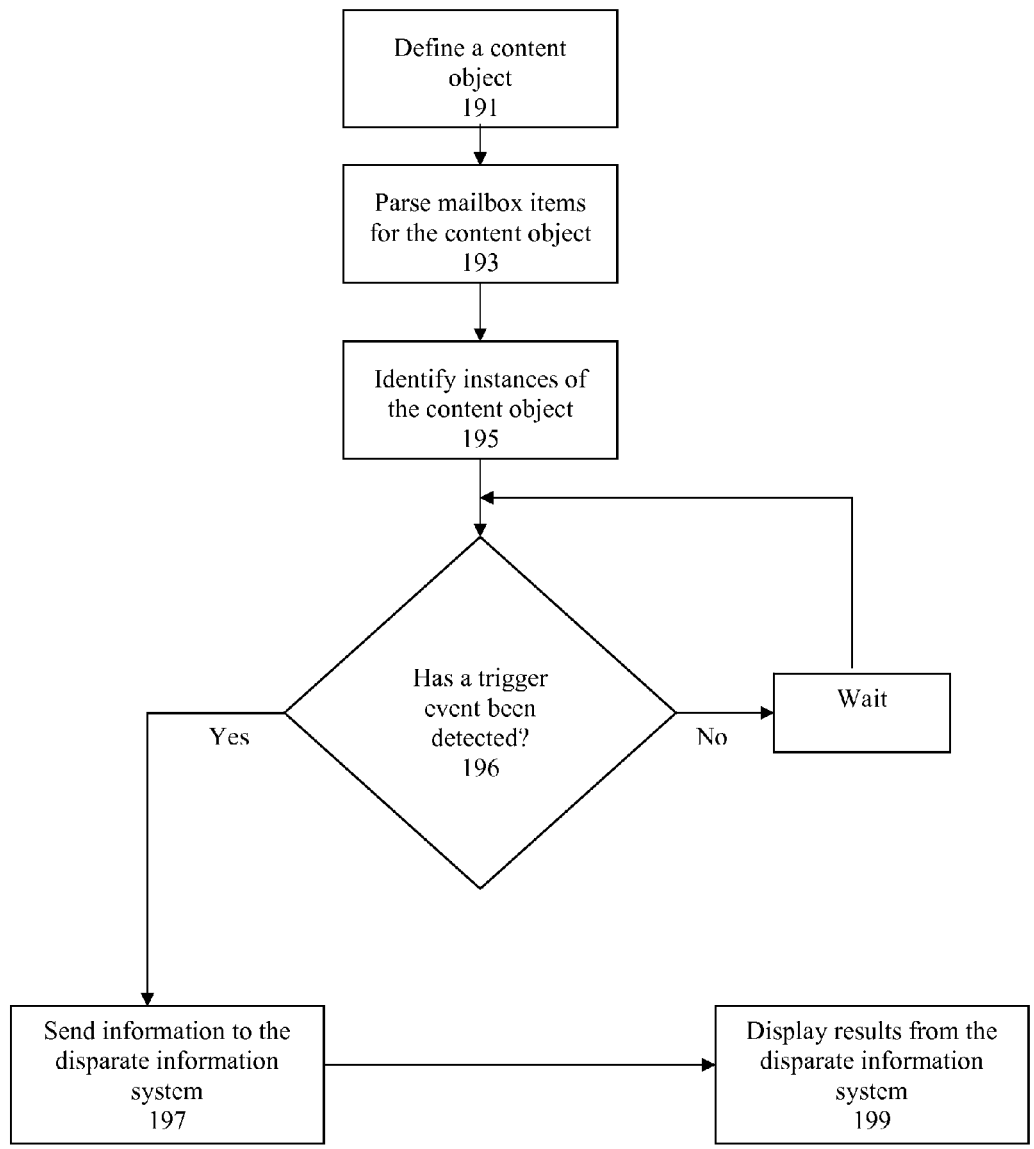
FIG. 1F is a flowchart which illustrates how a content object Zimlet functions in accordance with an embodiment of the present invention.

FIG. 1F is a flowchart which illustrates some of the steps involved in creating and using a content object Zimlet. The properties of a content object, as well as the ways a user can interact with the content object are defined (step 191). This step is discussed in detail in the implementation section below. Various mailbox items (such as email messages) are then parsed (step 193) for data having the defined properties. Any data with the defined properties is identified (step 195) as an instance of the content object. The system then checks (step 196) to see if a trigger event is detected. Examples of trigger events include double clicking, mousing over/hovering, right clicking, picking an option from a context menu, and so on. If a trigger event is detected, some or all of the information from the content object is sent (step 197) to a separate information system, along with any applicable instructions/commands for acting upon such content object. The results received from the information system are displayed (step 199) in the collaboration client.

In accordance with one embodiment of the present invention, content (such as email message bodies, calendar appointment notes, and contact fields) that contains one or more content objects can be searched and/or indexed. In one embodiment, the query languages "has" clause is used for this purpose. For example, in an embodiment where phone numbers are recognized as content object, a user can search for mailbox items containing phone numbers, via the "has: phone" clause. In one embodiment, mailbox items containing a particular phone number can also be searched for.

Figure 2A:
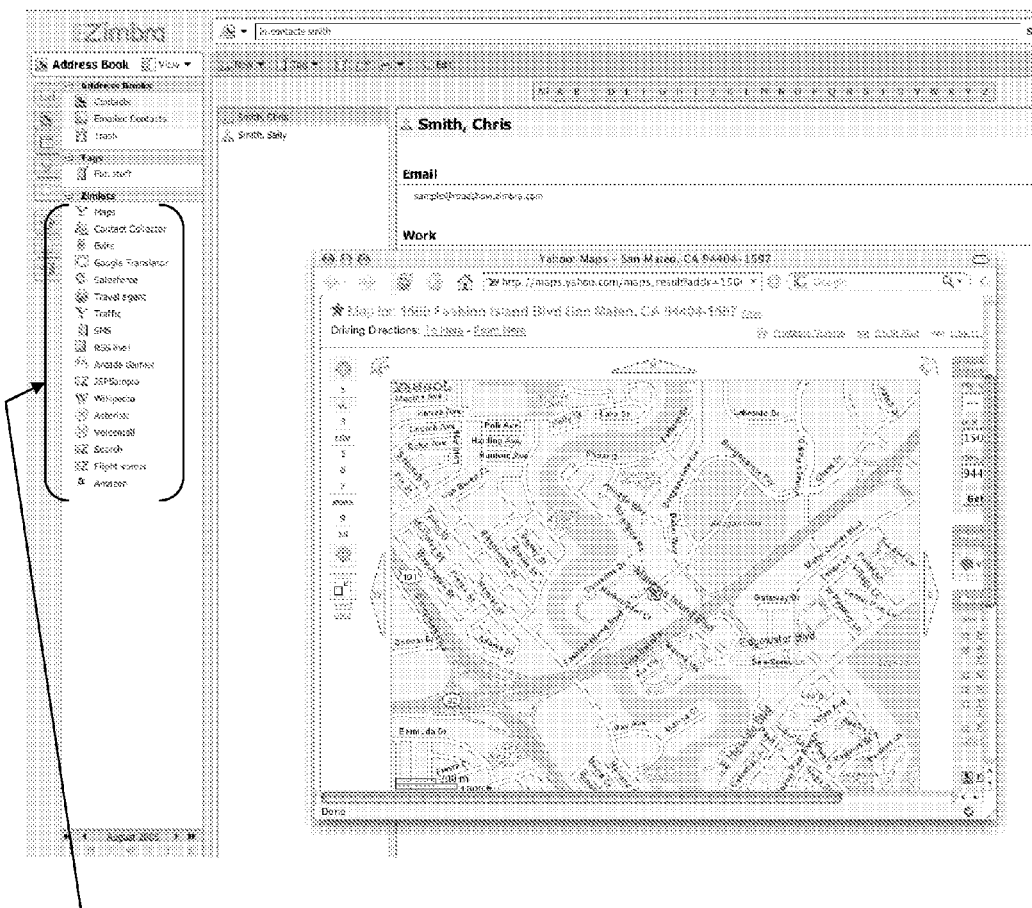
FIG. 2A is a screen shot which shows various such panel items in accordance with an embodiment of the present invention.

2. Panel Item Zimlets within the Collaboration Client Interface:

In one embodiment, the collaboration client in accordance includes various panel items in the application overview panel, which are essentially ways to access various information systems. FIG. 2A is a screen shot which shows various such panel items 210 in accordance with an embodiment of the present invention. In FIG. 2A, the following panel items are shown: "Maps", "Package Tracker", "Purchase Order", and "Travel Tracker". These panel items are shown for illustrative purposes alone, and this list is no way limiting.

The user interacts with the panel items in various ways, such as by dragging content such as mail messages, contacts and calendar appointment onto them, double clicking them, and invoking actions from a context menu. When the user interacts with a panel item, in one embodiment this results in sending the entered information (or the value of one more attributes of a mailbox item) to a separate information system, along with any applicable instructions/commands for acting upon such information.

Referring to FIG. 2A, the result of a user dragging a contact onto the "Maps" panel item is shown. In one embodiment, when a user drags one of his contacts onto the panel item 210 "Maps", the collaboration client sends the address from that contact to an external mapping program, such as Google maps from Google, Inc. (Mountain View, Calif.), Yahoo, Inc (Sunnyvale, Calif.) or Mapquest from Mapquest, Inc. (Denver, Colo.), with a request for a map corresponding to such address.

In an alternate embodiment, the panel items 210 do not create a window when activated. Instead the panel item icon itself may act as an interface to a separate information system. For example, a message that needs to be sent to a remote data storage or enterprise system can be dragged to a panel item 210 designed to send messages to a remote data storage or enterprise system. Instead of a window opening when a message is dragged to the panel item icon, the panel item icon may just flash or turn a different color to acknowledge that the message has been accepted.

Figure 2B:
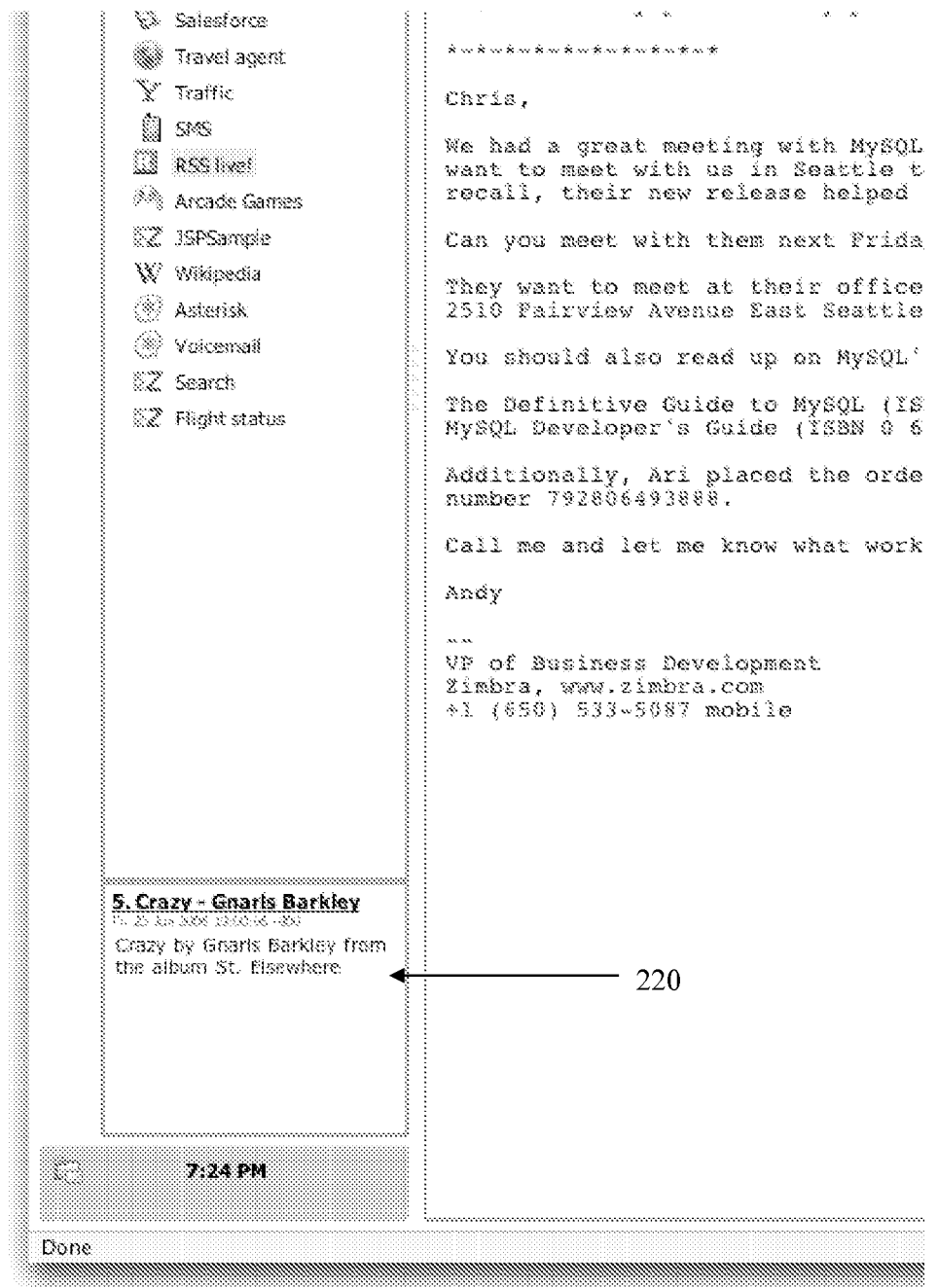
FIG. 2B is a screen shot of a collaboration client UI, which shows information regarding music being played, in accordance with an embodiment of the present invention.
Figure 2C:
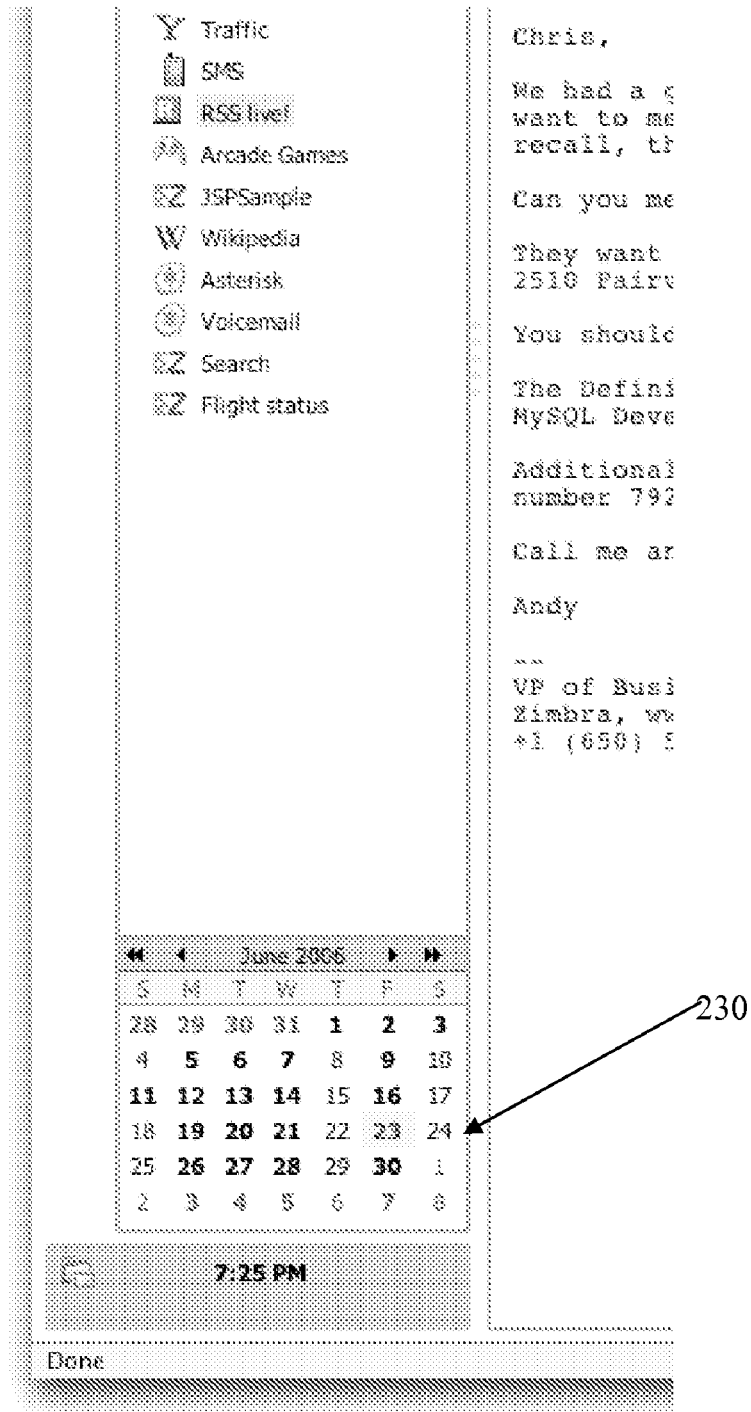
FIG. 2C is a screen shot of a collaboration client UI, which shows a monthly calendar being displayed in accordance with an embodiment of the present invention.

In one embodiment, a panel item may be used for more passive actions, such as displaying a message. In one embodiment, this may be triggered by the user's logging in. For instance, a motivational message of the day could be displayed when the user logs in. In one embodiment, information 220 regarding music being played is displayed in a pre-specified location (e.g., lower left hand corner of the collaboration client interface). This can be seen in FIG. 2B. In yet another embodiment, a panel item results in a display, of say, a monthly calendar 230, in a pre-specified location (e.g., lower left hand corner of the collaboration client interface). This can be seen in FIG. 2C. In still another embodiment, such a passive display may be triggered by a lapse of a predefined amount of time. For instance, at the beginning of every month, some type of reminder may show up.

Panel items 210 are a different user interface to disparate information systems as compared to content objects 110. Further, panel items 210 can also serve as fallback options if certain content cannot be recognized as a content object 110. This can happen, for example, in situations where certain information as the defined content object is not recognized as such because of some difference in format, etc. For example, even if an address is to be recognized as a content object, a foreign address may be formatted in such a way that the content object cannot be recognized. In such a situation, the user can simply drag the address over to the "maps" panel item 210 to obtain the map for the address.

Figure 2D:
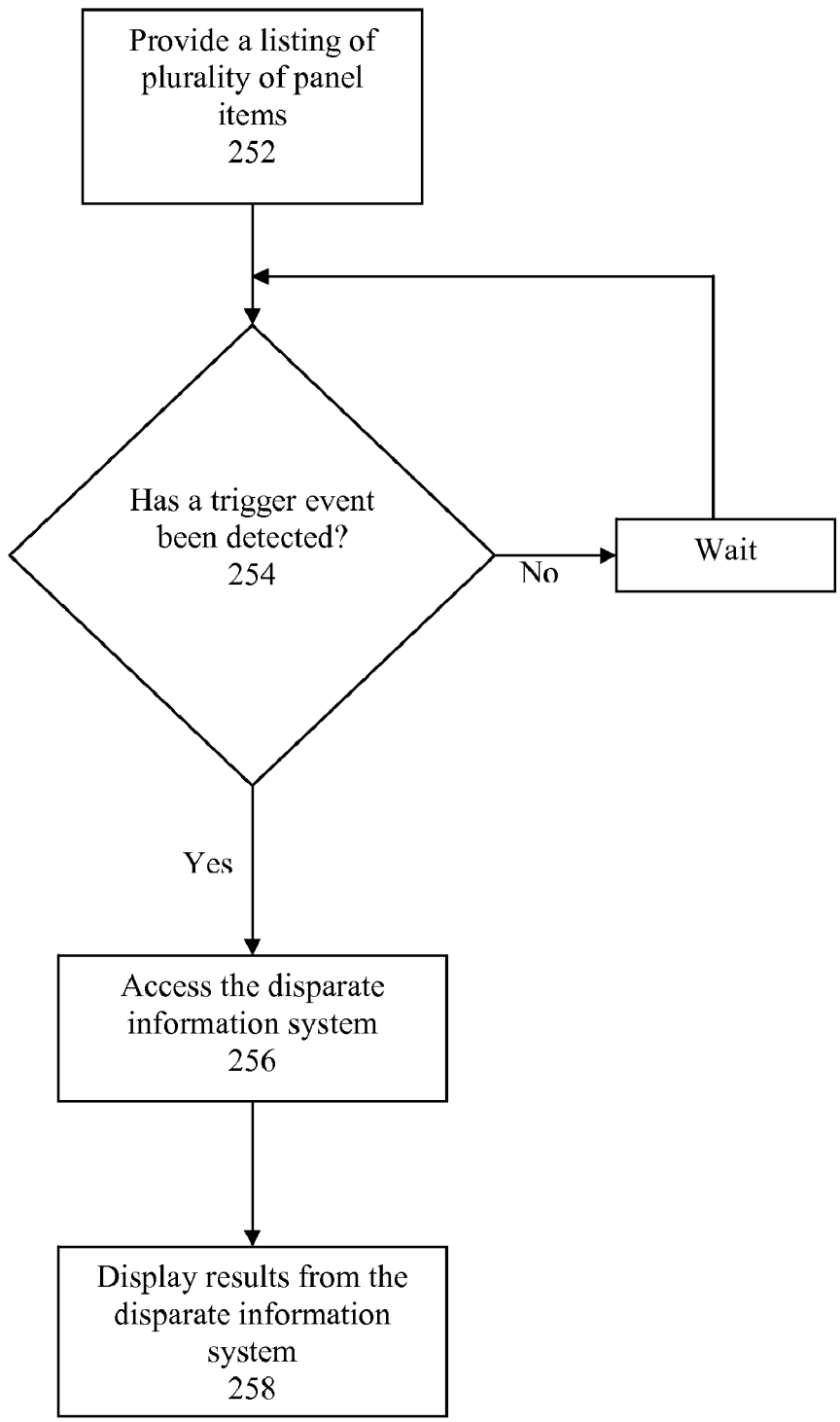
FIG. 2D is a flowchart which illustrates how a panel item element functions in accordance with an embodiment of the present invention.

FIG. 2D is a flowchart which illustrates how a panel item element functions in accordance with an embodiment of the present invention. A listing of a plurality of panel item elements is provided (step 252) in a panel in the collaboration client. Each of the panel items provides a user interface to access a disparate information system, and has associated with it the type of content that can be entered into it. It is determined (step 254) whether a trigger event has been detected for one of the panel items. Examples of trigger events include the user dragging part of a mailbox item and dropping it on to the panel item. If a trigger event has occurred, the disparate information system is accessed (step 256) via the panel item. Part or all of the content is sent, in one embodiment, to the disparate information system. In one embodiment, a result from the disparate information system is displayed (step 258) in the user interface.

System Architecture

Figure 3:
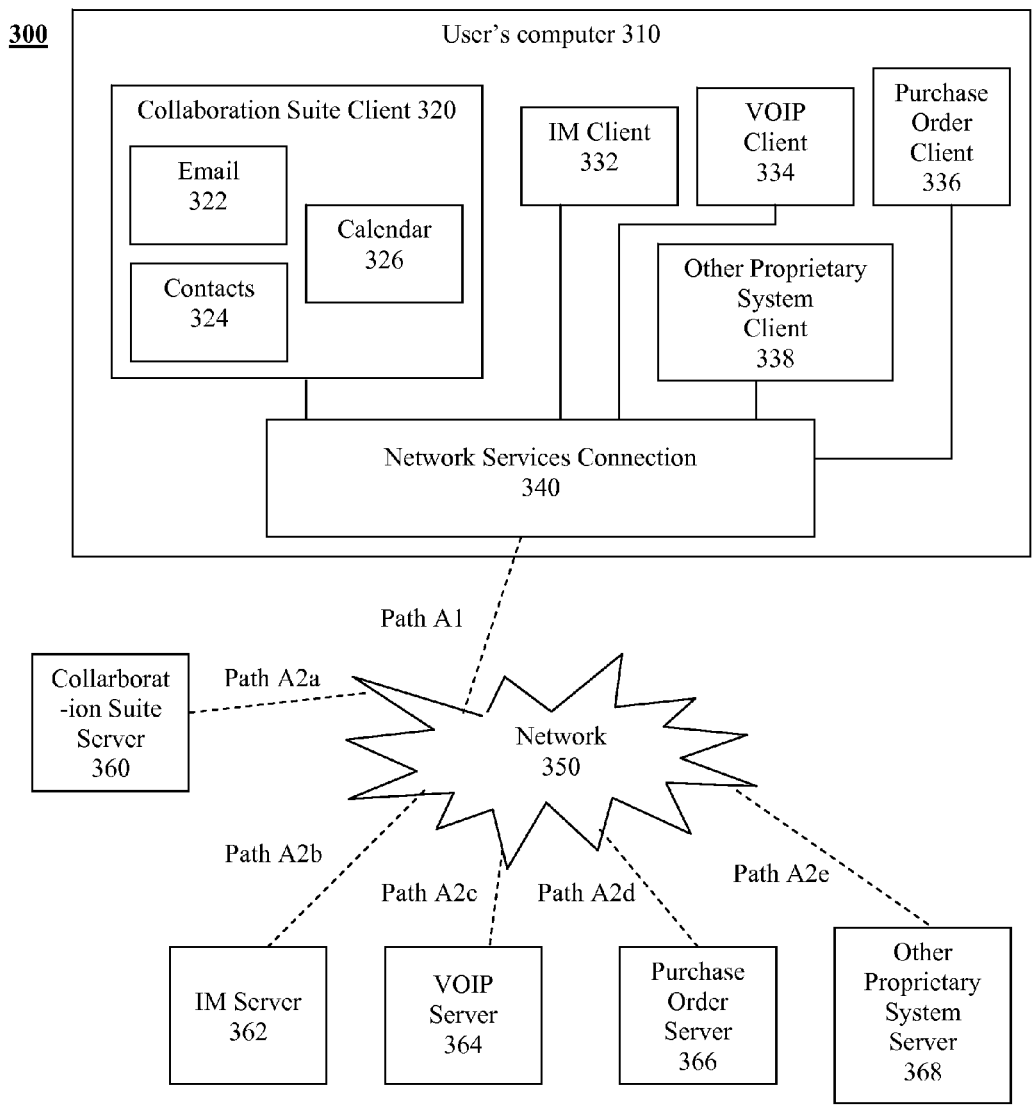
FIG. 3 is a block diagram which shows an example of a prior art system.

FIG. 3 is a block diagram which shows an example of a prior art system 300. System 300 includes a user's computer 310 with various modules, a network 350, and various remote servers including a Collaboration Suite Server 360, an Instant Messaging (IM) Server 362, a VOIP server 364, a Purchase Order Server 366, and an Other Proprietary System Server 368.

The user's computer 310 is a conventional computer system, that may include a CPU, a storage device, a network services connection 340, and conventional input/output devices such as, a display, a mouse, a printer, and/or a keyboard, that may couple to a computer system. The computer also includes a conventional operating system, an input/output device, and network services software. Several of these components are not shown in FIG. 3 for purposes of clarity. The computer, the storage device, and the network services connection, may be available from, for example, IBM Corporation (Armonk, N.Y.), Sun Microsystems, Inc. (Palo Alto, Calif.), Hewlett-Packard, Inc. (Palo Alto, Calif.), or Apple (Cupertino, Calif.)

The user's computer 310 includes several modules on it. One of the modules is the Collaboration Suite Client 320. As mentioned above, the Collaboration Suite Client 320 includes an Email application 322, a Contacts application 324, and a Calendar application 326. Some Collaboration Suite Clients 320 include other modules such as a To-Do List application, a Memo application, and so on. Outlook from Microsoft Corp. (Redmond, Wash.), Zimbra Collaboration Suite from Zimbra, Inc. (San Mateo Calif.), and Lotus Notes from IBM (Armonk, N.Y.) are examples of Collaboration Suite Clients 320.

Several other application clients are also resident on the user's computer 310. These include an (Instant Messaging) IM client 332, a Voice Over Internet Protocol (VOIP) client 334, a Purchase Order client 336, and an Other Proprietary System client 338.

The IM client 332 can be any available IM application. Some examples of the currently available IM programs are America OnLine Instant Messenger (AIM) from America Online, Inc. (Dulles, Va.), MSN® Messenger from Microsoft Corporation (Redmond, Wash.), and Yahoo!® Instant Messenger from Yahoo! Inc. (Sunnyvale, Calif.).

The VOIP client 334 can be any available VOIP application. Some example of currently available VOIP programs are Skype from Skype (Luxemborg), AT&T CallVantage from AT& Inc. (San Antonio, Tex.), and Vonage from Vonage (Holmdel, N.J.).

The Purchase Order client 336 can be any available Purchase Order application. Some example of currently available Purchase Order programs include applications provided by Oracle Corp. (Redwood Shores, Calif.), as well as accounting applications such as Peachtree Accounting from Sage Software (New Castle, UK), Quickbooks from Intuit, Inc. (Mountain View, Calif.), and Microsoft Dynamics GP from Microsoft Corp. (Redmond, Wash.).

The Other Proprietary System client 338 can include various other applications, such as, but not limited to, invoice tracking applications (such as those provided by Oracle Corp.), SKU management or inventory control applications, partner/VAT portals, order processing, shipment tracking, CRM applications, billing software, MLS software for Real Estate, etc.

The network service connection 340 includes hardware and software components that allow for connecting to a conventional network service. For example, the network service connection may include a connection to a telecommunications line (e.g., a dial-up, digital subscriber line ("DSL"), a T1, or a T3 communication line).

The network 350 can be any network, such as a Wide Area Network (WAN) or a Local Area Network (LAN), or any other network. A WAN may include the Internet, the Internet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or Windows NT from Microsoft Corporation (Redmond, Wash.). The network 350 may also include commercially available subscription-based services such as, for example, AOL from America Online, Inc. (Dulles, Va.) or MSN from Microsoft Corporation (Redmond, Wash.).

The Collaboration Suite Server 360, the IM Server 362, a VOIP server 364, a Purchase Order Server 366, and an Other Proprietary System Server 368, are servers with which the Collaboration Suite client 320, the IM client 332, the VOIP client 334, the Purchase Order client 336, and the Other Proprietary System client 338, respectively communicate.

Any communication that occurs from a client 320 or 332-338 on the user's computer 310 to a remote server 360-368 occurs via Path A1 (from the client to the network 350, via the network services connection 340), and then Path A2 (from the network 350 to the remote server). The user has to open each client separately in order to use it and to communicate with the corresponding server. For instance, consider that the user is reading an email in the Collaboration client 320 in which an IM Id is provided. In order to conduct an IM conversation with the person who's IM Id is provided in the email, the user has to open the IM client 332, cut and paste (or retype) the IM Id into the IM client. Installing several applications 332-338, and interacting with each of them every time is highly inconvenient for the user.

Figure 4:
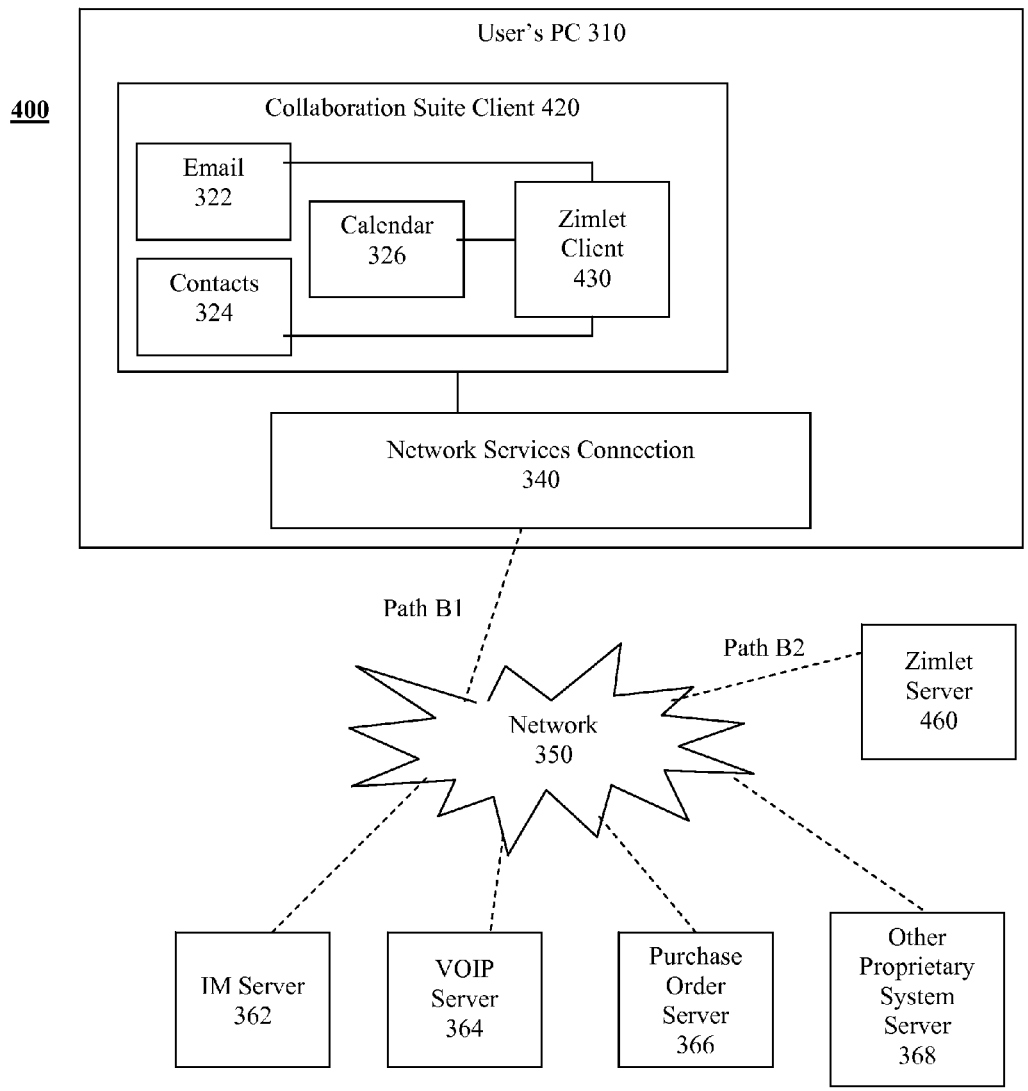
FIG. 4 is a block diagram of a system in accordance with an embodiment of the present invention.

FIG. 4 illustrates a block diagram of a system 400 in accordance with an embodiment of the present invention. As can be seen from FIG. 4, a system in accordance with an embodiment of the present invention includes client 430 and server 460 components. It is to be noted that, in an alternate embodiment, the Zimlet server 460 interacts with a standard Collaboration Suite Client 320.

The server 460 component is responsible for Zimlet life cycle management, server side indexing, and security. Each of these is discussed in further detail below. The client 430 is responsible for providing the framework to support presentation and user interaction.

It can be seen from FIG. 4 that, in accordance with one embodiment of the present invention, several of the clients 332-338 that were on the user's computer 310 in the prior art system 300 are not needed on the user's computer in system 400. This is because the Collaboration client 420 can serve as a user interface to not only the collaboration suite server 460 but also to the other remote servers 362-368. In another embodiment, the client applications 332-338 still reside on the user's computer 310.

In the embodiment shown in FIG. 4, when panel items 110 or content objects 210 are interacted with and/or recognized, the communication from various applications on the user's computer 310 goes, via the network services connection 340, to the network 350 via path B1, and then on to the Zimlet server 460 via path B2. The Zimlet server 460 in turn communicates with the various remote servers 362, 364, 366, and 368 as appropriate. The Zimlet server 460 is described in greater detail below with respect to FIG. 5.

The Zimlet client 430 supports the UI for each Zimlet and any parsing or object detection used to present the Zimlet related data to the user. In one embodiment, at login a list of available Zimlets for the current user is loaded from the Zimlet server 410. This list includes all the properties from each Zimlet definition file. The Zimlet definition file is discussed in more detail below in the Implementation section. The Zimlet client 430 framework then loads any additional JavaScript and populates any panel item Zimlets 210.

Figure 5:
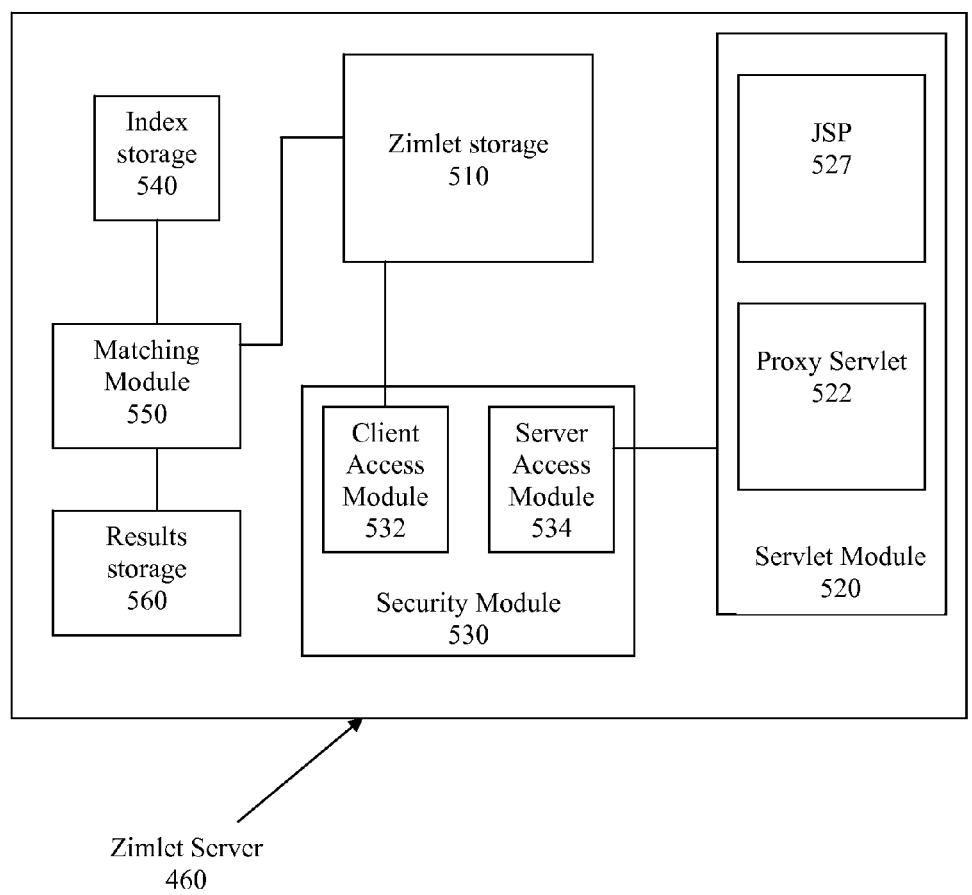
FIG. 5 is a block diagram of a Zimlet server in accordance with an embodiment of the present invention.

FIG. 5 is a block diagram that illustrates in greater detail the Zimlet server 460 in accordance with an embodiment of the present invention. The Zimlet server 460 includes, in one embodiment, a Zimlet storage 510, a servlet module 520, a security module 530, an index storage 540, a matching module 550, and a results storage 560.

The Zimlet storage 510 includes a list of the various Zimlets available on the Zimlet server 460. In one embodiment, these Zimlets include content objects 110 as well as panel items 120. In one embodiment, not all Zimlets can be used by all users. Rather, each user is granted access to specific Zimlets. This access may be granted, in one embodiment, by the system administrator. In one embodiment, some generic Zimlets are provided to each user, while other Zimlets are available only to specific users. For instance, the map panel item may be available to all users, while purchase order content items and their approval/rejection can only be done by, say, manager level users. In one embodiment, even custom Zimlets written by the users and/or administrators are stored on the Zimlet server 460.

When a content object Zimlet 110 is recognized, or a panel item Zimlet 210 is interacted with, all requests to the Zimlets are transmitted to the servlet module 520 in the Zimlet server 460. For security reasons, Zimlets do not communicate directly with remote servers 362 . . . 368. Instead, they talk to the servlet module 520. In one embodiment, the servlet module 520 is comprised of a proxy servlet 522 and a JSP 527. As mentioned above, in accordance with one embodiment of the present invention, a Zimlet running on the user's computer 310 cannot directly communicate with a remote server 362 . . . 368 for security reasons. Instead, Zimlets will have access to the servlet module 520 in order to fetch and manipulate the contents from remote servers 362 . . . 368. The proxy servlet 522 is used, in one embodiment, to simply pass on an HTTP request after appropriate authentication. The proxy servlet 522 authenticates the request to the server in conjunction with the server access module in the security module 530. Each Zimlet needing the access to proxy servlet 522 need to be listed in the proxy servlet 522, along with the white list of the URLs that the Zimlets need. The requests made to URLs not in the white list will be denied. For all the authenticated requests, the proxy servlet 522 in turn makes HTTP request to one or more remote machines 362 . . . 368 on behalf of the Zimlet, and proxies the result back to the Zimlet.

In one embodiment, the Zimlet JSP 527 implements any other server side data retrieval and manipulation for the actions to be performed on the client. The UI passes the matching text and which action button the user selected to the JSP 527. In one embodiment, Simple Object Access Protocol (SOAP), a protocol for exchanging XML-based messages over a computer network, can be used to implement this. The Zimlet jsp code may then use any protocol or API needed to fetch data or act on the user's selection. For example, the JSP 527 is used to talk to remote databases in SQL, or in other protocols (such as UDP), and so on.

The security module 530 serves two main purposes. First, it verifies that a given client 310 from which the request originated has access to a given Zimlet based on whether the user's class of service permits access to the requested Zimlet. This is performed, in one embodiment, by the client access module 532. In one embodiment, the user's class of service is established by the server administrator. Second, it prevents unauthorized access to remote servers by Zimlets by ensuring that each request has a valid authentication token. This is performed, in one embodiment, by the server access module 534.

An index storage 540 is present on the server 460 in accordance with an embodiment of the present invention. This indexing is described in more detail below in the context of the matching module 550.

In one embodiment, the matching module 550 performs two functions: (i) it analyzes the content of any mailbox item for any matches with content objects 110; and (ii) it searches mailbox items for any predefined index searches. In another embodiment, a separate module exists for indexing/searching. In yet another embodiment, the content of mailbox items is searched for content objects in the client 430 rather than in the server 460.

As mentioned before, indexes/predefined searches can be performed in one embodiment, based on the indexes in the index storage 540. In one embodiment, if a mailbox item contains a search term, a Boolean flag is set to "True" (or 1) for that mailbox item. When, for example, an email is received at server 460, it is parsed to check if it contains any indexed terms, and the Boolean flag is set appropriately. The email is then sent on to the collaboration client 410. When a user later desires to retrieve the indexed items, all mailbox items with the Boolean flag set appropriately are retrieved.

Because of the client-server architecture, indexing/searching of content objects 110 can be performed across various collaboration suite applications such as email 322, contacts 324, and calendar 326. In addition, indexing/searching can also be performed across various user computers 310 (for example, the mailboxes of all employees of an organization). Such indexing across different computers (e.g., for search/discovery across mailboxes) provides for compliance with various regulations, such as Sarbanes-Oxley, Human Resources, litigation discovery processes, fiduciary isolation of business units (such as automatically recognizing equity-related communications), and so on.

In accordance with an embodiment of the present invention, pre-indexed searches of content (such as email message bodies, calendar appointment notes, and contact fields) that contains one or more content objects can be combined with live searches. For instance, a pre-indexed search "has: phone" can be combined with a live search for a specific name, "Jack". The result would return any content which has the name Jack and which includes a phone number. Details regarding the implementation of such indexing are provided below in the Implementation section.

Figure 6:
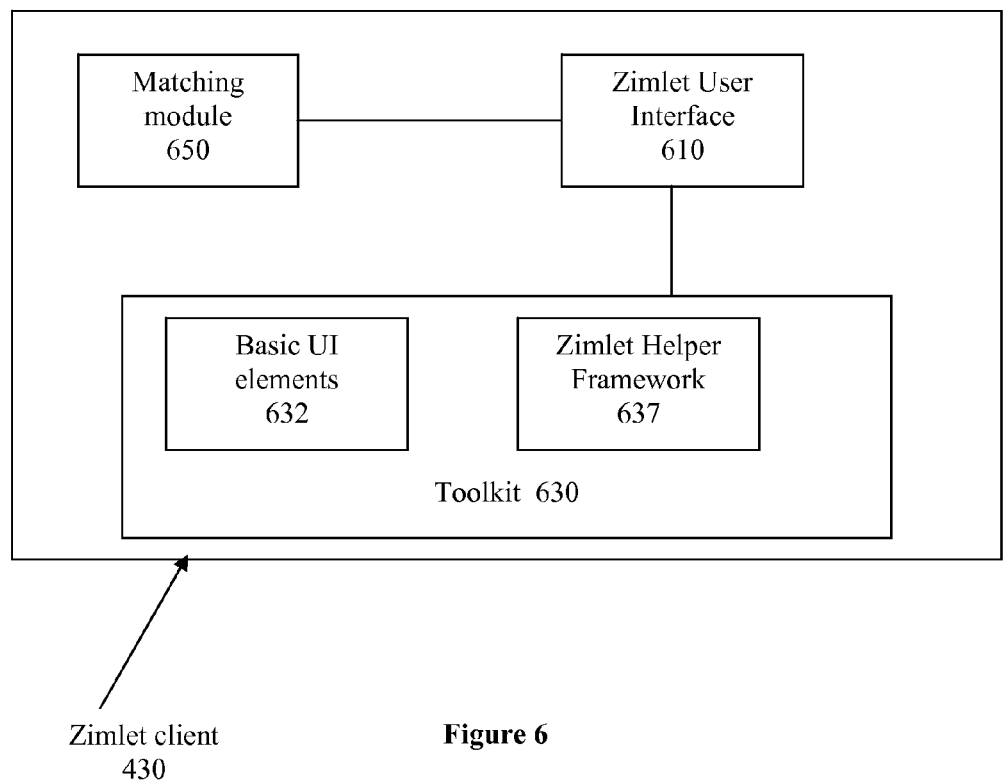
FIG. 6 is a block diagram of a client in accordance with one embodiment of the present invention.

FIG. 6 is a block diagram of a client 430 in accordance with one embodiment of the present invention. It is to be noted that one of more of the modules included in the Zimlet server 460 can be moved over to the client 310. However, the more the modules that are moved on to the client, the more the computation overhead for the user's computer 310. For example, the matching module 650 is on the client in one embodiment of the present invention. In one embodiment, there is a matching module 550 on the Zimlet server 460, as well as on the client 430. In one such embodiment, the matching module 550 on the Zimlet server 460 performs predefined index searches, while the matching module 650 on the client 430 finds content objects 110.

The client 430 also includes the Zimlet user interface 610. The Zimlet user interface in accordance with an embodiment of the present invention has been discussed above with reference to FIGS. 1A-1E and 2A-2C. In addition, the client 430 includes a toolkit 630. The toolkit 630 serves the purpose of allowing the user and/or administrator of the collaboration client 410 to create new and/or customized Zimlets. The toolkit includes basic UI elements 632 and a Zimlet helper framework 637. The basic UI elements 632 includes fundamental UI elements such as pop-ups, menus, etc. The Zimlet helper framework 637 provides for more complex Zimlet authoring. The Zimlet helper framework 637 provides common methods for tasks like Network Access, XML document conversion, access to Collaboration data like user preferences, or contact and event info. The Zimlet Helper framework 637 also provides the Zimlet author with per user storage for Zimlet preferences or state data specific to that Zimlet/User combination. Further details regarding how Zimlets can be written are in the following section.

Implementation

This section describes in some detail how Zimlets are implemented in accordance with an embodiment of the present invention. As mentioned above, a Zimlet is a bundle of files that enable the integration of the ZCS platform with disparate information systems and content. It is possible, in one embodiment for a system administrator to write his or her own Zimlets and/or tailor them to interface with whatever information systems best suit user needs. Further, Zimlets can be customized to display the results in a format and manner preferred by the system administrator, and based upon triggers (e.g., mousing over, right clicking, etc.) preferred by the system administrator.

Figure 7:
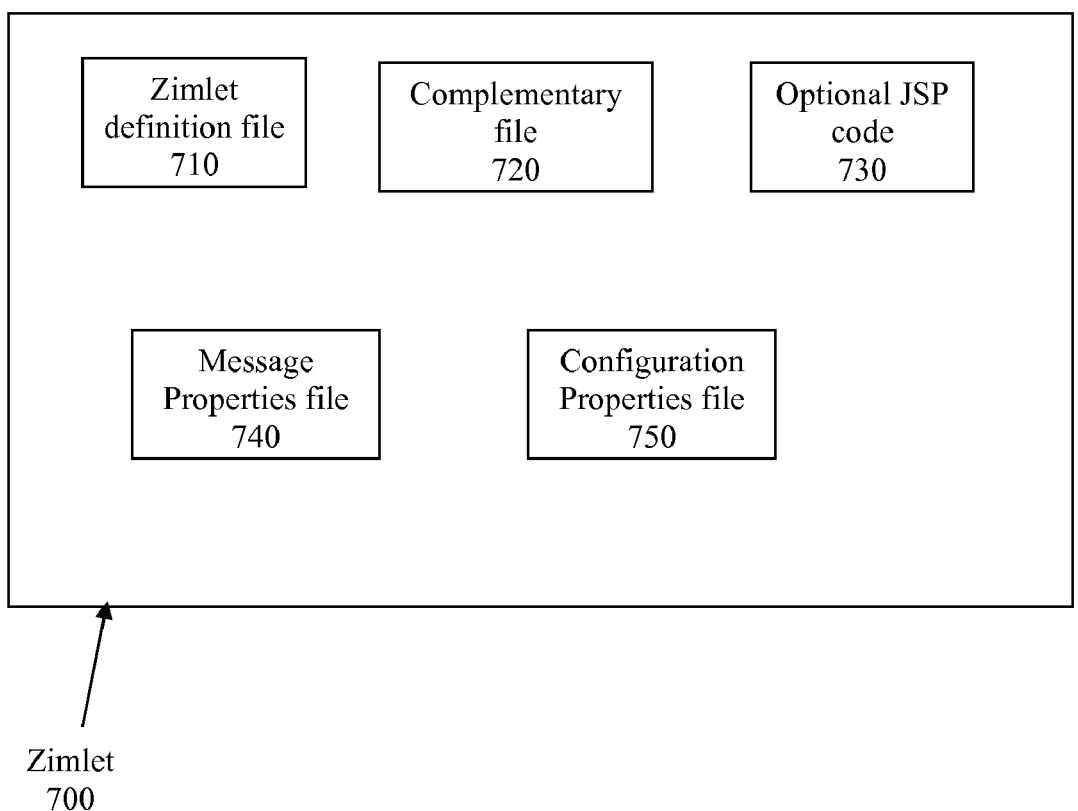
FIG. 7 shows a Zimlet as implemented in one embodiment.

FIG. 7 shows a Zimlet 700 as implemented in one embodiment. It is to be noted that the <Zimlet> label in descriptions below would be replaced with the name of the particular Zimlet.

Zimlet Definition file 710: In one embodiment, this is implemented as an XML file <Zimlet>.xml. The Zimlet description file is probably the most important file in the Zimlet bundle. It specifies the behavior of the Zimlet. In one embodiment, the behavior of the Zimlet is fully specified in this file, and this is in fact the only file in the bundle.

Complementary file 720: While it is possible to completely define a Zimlet declaratively within the Zimlet description file, in many instances it may be desired to provide some complementary description for some functions. In one embodiment, this complementary file is implemented in JavaScript <Zimlet>.js. In one embodiment, the Zimlet JavaScript class provides the base class whose methods may be overridden to provide custom implementations for various Zimlet functions. As mentioned earlier, in one embodiment, the client 430 is implemented with AJAX. In one embodiment, this file 620 is only required for those Zimlets requiring the extension of the AJAX client with custom JavaScript code.

Optional JSP code 730: In one embodiment, optional JSP code <Zimlet>.jsp is included to implement connectivity, data retrieval or additional server-side data functionality. In one embodiment, only Zimlets requiring custom server side implementations need provide a JSP implementation. In one embodiment, the Zimlet infrastructure provides a generic proxy JSP for making arbitrary calls to external systems or services.

Message properties file 740—This file is the fallback Zimlet message property file in one embodiment of the present invention. By using Java property files, Zimlets are easily localizable.

Configuration properties file 750: This a template file config_template.xml for the configuration properties for the Zimlet.

In addition, in one embodiment, the Zimlet bundle also includes one or more of the following:

Additional supporting JavaScript files

A Java class that extends com.zimbra.cs.object.ObjectHandler to help match Zimlet content objects for server-side indexing Additional properties files for the locales for which the Zimlet has been localized.

As mentioned above, the Zimlet definition file 710 is extremely important. In some embodiments, this file entirely specifies the Zimlet's behavior. The definition file can include what the Zimlet is (e.g., what regular expression is to be recognized as a content object, or the name and icon for a panel item), what trigger events to recognize (e.g., mousing over, and right clicking for content objects, dragging-dropping, right-clicking, double-clicking, or simply the user logging in, or a certain amount of time elapsing for panel items), what actions to take (e.g., contact a remote server with certain parameters and instructions) and how to display the results (e.g., display the results in a pop-up browser window within the collaboration client, or display the results in a new browser window).

Some details regarding the Zimlet definition file 710 in accordance with an embodiment of the present invention follow. The <Zimlet> element is the enclosing element in the definition file. It may contain a number of child elements, some optional, that define the Zimlet. One or more of the elements can be required, while others may be optional in different embodiments of the present invention. The following sub sections describe each of these child elements:

<name> Element

The <name> element is the name of the Zimlet and a required element in accordance with an embodiment of the present invention. This must be the same name as is used to prefix all the well defined files in the Zimlet bundle. In one embodiment, the Zimlet name is required to be unique.

e.g., <name>Maps</name>

<version> Element

The version element describes the current version of the Zimlet as follows:

e.g., <version id="2.0"/>

<description> Element

The description element contains text describing the Zimlet.

e.g.,    <description>
        This Zimlet will provide map information for street addresses
   </description>

<include> Element

As mentioned above, in certain cases a Zimlet implementation may require additional JavaScript code to be loaded by the client 430. For such cases, the <include> tag is provided. The content of this tag provides a reference to the additional script files that are to be loaded. These files may be internal, that is specified by a relative URL (e.g. foo.js) or external, that is specified by an absolute URL (e.g. http://api.google.com/mapsjs).

```
e.g.,   <include>http://api.google.com/maps.js</include>
        <include>gmaps.js</include>
```

<contentObject> Element

As described above, a content object 110 is an object that is recognized by a Zimlet in a body of content, such as email message body, the notes of an appointment, or fields in a contact. Examples of content objects include phone numbers, URLs, purchase order numbers, package tracking numbers, etc. The <contentObject> element defines the content object that a Zimlet recognizes and how the user interacts with the object. It is to be noted that some data, for instance, phone numbers have different characteristics based upon which country and/or region they are in. Similarly, other information (such as addresses, dates, etc.) also have different formats based on the context. Such varied formats and/or context appropriateness can be easily taken into account when defining the content object. If a Zimlet does not expose a content object then this element may be omitted. The <contentObject> element is discussed in greater detail below.

<ServerIndexed> Element

The <serverIndexed> element describes how a content object is indexed on the server. As mentioned above, content, such as email message bodies, calendar appointment notes, and contact fields, that contains one or more Zimlet content objects may be searched for. In one embodiment, this searching is done via the query languages "has" clause. For example, if a Zimlet were to define phone numbers as a content object, then to search for content containing phone numbers, a <serverIndexed> element would be specified that defines phone numbers, and would enable searching for content containing phone numbers via the "has:phone" clause. The <serverIndexed> element is discussed in greater detail below.

<ZimletPanelItem> Element

The Zimlet panel items 210 appear within the Zimlet client's 430 overview panel. In one embodiment, the overview panel is to the right of the application buttons and also includes panels for a user's folders, tags, and saved searches. By defining a <ZimletPanelItem>, a Zimlet may add an item to the Zimlet panel within the overview panel. The user may interact with a Zimlet panel item 210 by doubling clicking it, as well as by dragging and dropping various objects, such as contacts, conversations, and mail messages onto it. As part of the panel item definition, the Zimlet author specifies the types of objects that the Zimlet supports as well the actions to be performed on those objects. The <ZimletPanelItem> element is discussed in greater detail below.

Below is an example outline of a Zimlet definition file:

```
<Zimlet>
    <name>Maps</name>
    <version id="2.0">
        <upgrade id="1.0">migrate.pl -v1.0</update>
        <upgrade id="1.5">migrate.pl -v1.5</update>
    </version>
    <description>Address mapping</description>
    <include>http://api.google.com/maps.js</extraScripts >
    <include>gmaps.js</extraScripts >
    <contentObject>...</contentObject>
    <serverIndex>...</serverIndexed>
    <ZimletPanelItem>...</ZimletPanelItem>
</Zimlet>
```

Content Object Element in Further Detail:

The <contentObject> element mentioned above is described in greater detail here, as it is implemented in accordance with an embodiment of the present invention. The <contentObject> element may contain a number of child elements, some of which may be required and some of which may be optional in accordance with various embodiments of the present invention. Some of the child elements are:

<matchOn> Element

The <matchOn> element specifies the rules for the matching content objects on the client. In one embodiment, two mechanisms are used to define these rules:

1. The first is with the <regex> element. This content of this element specifies a regular expression that defines the Zimlet's content object. In one embodiment, JavaScript is used, and the format of this regular expression must follow the JavaScript regular expression grammar.
2. If the content object matching rules cannot be expressed by a regular expression, then a <actionJavaScript> element may be provided.

```
e.g.,   <matchOn>
            <regex>1[zZ]\\s?\\w{3}\\s?\\w{3}\\s?\\</regex>
        </matchOn>
```

<onClick> Element

The <onClick> element defines the behavior for the click action. This usually means the user clicking on a content object with the left mouse button. In one embodiment, <onClick> includes a description of what action to take (e.g., specifying the URL to be loaded), the visual action to be taken (e.g., how to present content to the user—whether to present it in-line or in a new window, the dimensions of a visual, etc.), etc.

In the example below, when the user clicks on the Zimlet content object, a new browser window of 300×300 pixel dimension is opened. The browser is loaded with the content of the URL specified in the <actionUrl> element

```
e.g.,   <onClick>
            <canvas type="window" width="300" height="300"/>
            <actionUrl method="get" target="http://maps.google.com">
                <param name="">${src.objectContent}</param>
            </actionUrl>
        </onClick>
```

<toolTip> Element

When a user hovers their mouse over an object, a tool tip may be popped up. The <toolTip> element controls the behavior of this tool tip. In one embodiment, the <toolTip> element includes various attributes including the action to take (e.g., what URL to load), visual elements (such as whether the tool tip is sticky or not, and the dimensions of the tool tip, and so on), etc.

```
e.g.,   <toolTip sticky="true" width="100" height="200">
            <actionUrl method="get" target="http://maps.google.com">
                <param name="" value="${src.objectContent}"/>
            </actionUrl>
        </toolTip>
```

Server Indexed Element in Further Detail:

The <serverIndexed> element is described in more detail here. As mentioned above, to have the Zimlet server 460 provide an index for a contentObject defined by a Zimlet, a <serverIndexed> element must be provided. This element has a number of important child elements which determine how the indexing takes place on the server 460, some of which are discussed below:

<hasClauseKeyword> Element

This element specifies the keyword that will be used with the query language's "has" clause e.g. "has:address", or "has:id".

<matchOn> Element

The <matchOn> element specifies the rules the server will use to determine if given content (such as an email message) contains one or more instances of the content object defined by the Zimlet. This is similar to the <matchOn> element described above in the context of <contentObject> element.

```
e.g.,   <serverIndexed>
            <hasClauseKeyword>address</hasClauseKeyword>
            <matchOn>
                <javaClass>com.acme.Matcher</javaClass>
            </matchOn>
        </serverIndexed>
```

Zimlet Panel Item Element in Further Detail:

The <ZimletPanelItem> element is discussed here. In one embodiment, the Zimlet panel appears within the Zimlet client's 430 overview panel. In one embodiment, the overview panel is to the right of the application buttons and also contains panels for a user's folders, tags, and saved searches. In one embodiment, by defining a <ZimletPanelItem>, a Zimlet adds an item to the Zimlet panel within the overview panel. The user may interact with a Zimlet panel item by doubling clicking it, as well as by dragging and dropping various objects, such as contacts, conversations, and mail messages onto it. As part of the panel item definition, the Zimlet author specifies the types of objects that the Zimlet supports as well the actions to be performed on those objects. If a Zimlet author does not wish to expose a panel item for their Zimlet, then this element may be omitted. In one embodiment, the attributes of the <ZimletPanelItem> include the label that will be displayed as the text label for the Zimlet panel item, and the icon to be displayed as the Zimlet panel item's icon. In addition, the child elements of the <ZimletPanelItem> include an element for defining the tool tip text to be displayed when a user hovers their mouse over the Zimlet panel item, and an element for defining the behavior for the double click action. Some other child elements include, in one embodiment, an element for specifying a drag source for the Zimlet panel item. A drag source consists of a mailbox item e.g. a conversation, a contact, or a mail message, and the action to be performed when an object of that type is dropped on the panel item.

Figure 8:
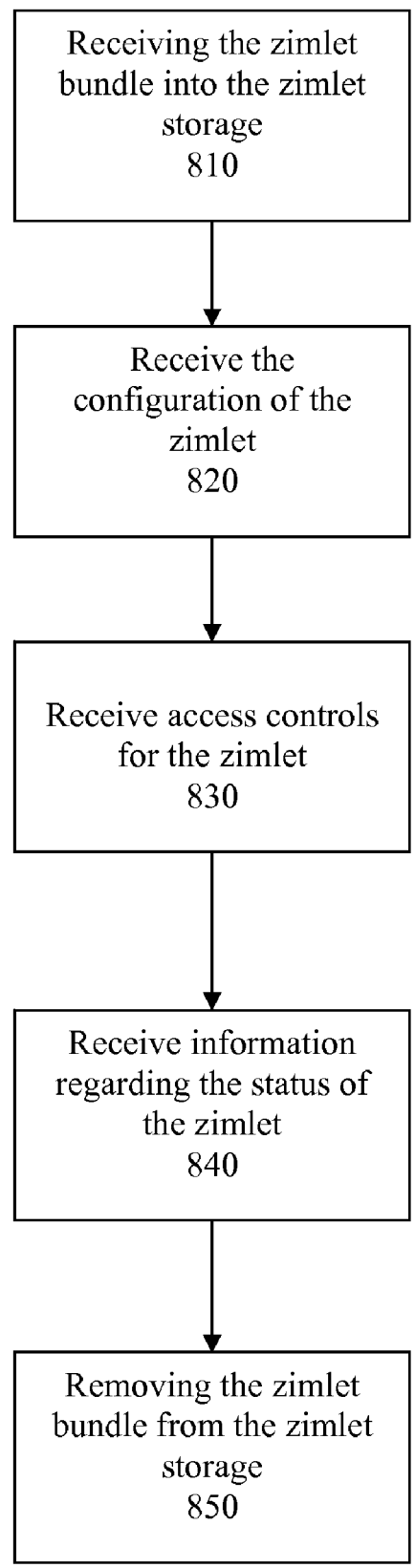
FIG. 8 is a flowchart which illustrates the life-cycle of a Zimlet in accordance with an embodiment of the present invention.

FIG. 8 is a flowchart which illustrates the life-cycle of a Zimlet in accordance with an embodiment of the present invention. When a new Zimlet is created, it is received (step 810) into the Zimlet storage 510. Further, the Zimlet configuration is also received (step 820) into the Zimlet storage 510. The configuration includes in one embodiment, global properties of the Zimlet as well as properties of the Zimlet that are specific to particular clients 430. The security module 530 then receives (step 830) client and server access rules for the Zimlet. Information regarding the status of the Zimlet is then received (step 840). For instance, a Zimlet may be enabled or disabled. In one embodiment, when a Zimlet is enabled, it is made available to all users to whom access has been granted.

At the end of its life cycle, the Zimlet is removed from the Zimlet storage 510, and the undeployment of the Zimlet is received (step 850).

Further details regarding an example implementation of a system and method in accordance with embodiments of the present invention can be found in provisional applications 60/774,017 and 60/730,255, to which this application claims priority, and which are incorporated by reference herein.

While particular embodiments and applications of the present invention have been illustrated and described, it is to be understood that the invention is not limited to the precise construction and components disclosed herein. For example, applications other than collaboration suites may use various embodiments of the present invention. As another example, the server side implementation of the present invention may be integrated with a standard collaboration suite client. Further, other languages and/or protocols may be used to implement a system and method in accordance with the present invention. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. A method for integrating a plurality of information systems with a first information system including a user interface, the method comprising:

presenting an object via the user interface of the first information system;

providing a listing of a plurality of panel item elements within the user interface of the first information system, wherein (i) each of the plurality of panel item elements provides a user interface to access a corresponding one of the plurality of information systems when a user initiates a trigger event based on user interaction with the object and one of the plurality of panel item elements, (ii) the triggering event and the corresponding user interaction are defined by an integration component associated with each of the plurality of panel item elements, (iii) the integration component includes a bundle of files that are deployed from an integration server to the first information system to enable an integration of the first information system with the plurality of information systems, (iv) the integration component is configured to define a plurality of actions that are implemented when a user interacts with one of the plurality of panel item elements, (v) specifications for each of the plurality of panel item elements are downloaded from the integration component via the integration server, and (vi) the integration server and each of the plurality of information systems are located remotely from the first information system;

determining whether a trigger event has occurred for one of the plurality of panel item elements based on user interaction with the object, wherein code to perform the determining of the trigger event is included in the downloaded specifications; and in response to determining that the trigger event has occurred, accessing the one of the plurality of information systems via the one of the plurality of panel item elements, wherein code to perform the accessing of the information system is included in the downloaded specifications.

2. The method of claim 1, wherein the trigger event comprises receiving content from the object which is dragged over to and dropped onto the one of the plurality of panel item elements.

3. The method of claim 2, wherein the step of accessing one of the plurality of information system comprises passing a subset of the received content to the one of the plurality of information systems.

4. The method of claim 3, further comprising displaying, within the first information system, a window with information from the one of the plurality of information systems based upon the subset of the received content.

5. The method of claim 2, wherein the content is part of a mailbox item.

6. The method of claim 1 wherein the first information system is a collaboration suite executing at the remote server and accessible through a client application at a client computer system.

7. The method of claim 1, wherein the trigger event comprises a passage of a pre-specified period of time.

8. The method of claim 1, further comprising displaying, within the one of the plurality of panel items, information obtained from the one of the plurality of information systems.

9. The method of claim 8, wherein the information comprises a weather forecast.

10. The method of claim 1, wherein accessing the one of the plurality of information systems occurs through the remote server which acts as a proxy.

11. A non-transitory computer readable medium configured to store instructions executable by a processor to integrate a plurality of information systems with a first information system including a user interface, the instructions when executed by the processor causing the processor to:
present an object via the user interface of the first information system;
provide a listing of a plurality of panel item elements within the user interface of the first information system, wherein (i) each of the plurality of panel item elements provides a user interface to access a corresponding one of the plurality of information systems when a user initiates a trigger event based on user interaction with the object and one of the plurality of panel item elements, (ii) the triggering event and the corresponding user interaction are defined by an integration component associated with each of the plurality of panel item elements, (iii) the integration component includes a bundle of files that are deployed from an integration server to the first information system to enable an integration of the first information system with the plurality of information systems, (iv) the integration component is configured to define a plurality of actions that are implemented when a user interacts with one of the plurality of panel item elements, (v) specifications for each of the plurality of panel item elements are downloaded from the integration component via the integration server, and (vi) the integration server and each of the plurality of information systems are located remotely from the first information system;
determine whether a trigger event has occurred from one of the plurality of panel item elements based on user interaction with the object, wherein code to perform the determining of the trigger event is included in the downloaded specifications; and
in response to determining that the trigger event has occurred, access the one of the plurality of information systems via the one of the plurality of panel item elements, wherein code to perform the accessing of the information system is included in the downloaded specifications.

12. The non-transitory computer readable medium of claim 11, wherein the trigger event comprises receiving content from the object which is dragged over to and dropped onto the one of the plurality of panel item elements.

13. The non-transitory computer readable medium of claim 12, wherein the instructions causing the processor to access one of the plurality of information system cause the processor to pass a subset of the received content to the one of the plurality of information systems.

14. The non-transitory computer readable medium of claim 13, wherein the instructions further cause the processor to display, within the first information system, a window with information from the one of the plurality of information systems based upon the subset of the received content.

15. The non-transitory computer readable medium of claim 11, wherein accessing the one of the plurality of information systems occurs through the remote server which acts as a proxy.

16. The non-transitory computer readable medium of claim 11 wherein the first information system is a collaboration suite executing at the remote server and accessible through a client application at a client computer system.

17. A system for integrating a plurality of information systems with a first information system including a, the system comprising:
a server comprising an integration component that includes a bundle of files that enable an integration of the first information system with the plurality of information systems, the integration component defining a plurality of actions that are implemented when a user interacts with one of a plurality of panel item elements;
a user interface in the first information system, the user interface configured to:
present an object to a user; and
display a list of the plurality of panel item elements to the user, wherein (i) each of the plurality of panel item elements provides a user interface to access a corresponding one of the plurality of information systems when a user initiates a trigger event based on user interaction with the object and one of the plurality of panel item elements, (ii) the triggering event and the corresponding user interaction are defined by the integration component associated with each of the plurality of panel item elements, (iii) specifications for each of the plurality of panel item elements are downloaded from the integration component, and (iv) each of the plurality of information systems is located remotely from the first information system; and
a processor programmed to:
determine whether a trigger event has occurred for one of the plurality of panel item elements based on user interaction with the object, wherein code to perform the determining of the trigger event is included in the downloaded specifications; and
in response to determining that the trigger event has occurred, access the one of the plurality of information systems via the one of the plurality of panel item elements, wherein code to perform the accessing of the information system is included in the downloaded specifications.

18. The system of claim 17, wherein the trigger event comprises receiving content from the object which is dragged over to and dropped onto the one of the plurality of panel item elements.

19. The system of claim 18, wherein the processor is further programmed to pass a subset of the received content to the one of the plurality of information systems.

20. The system of claim 19, wherein the user interface is further configured to display a window with information from the one of the plurality of information systems based upon the subset of the received content.

* * * * *